United States Patent [19]
Wykhuis

[11] 3,791,116
[45] Feb. 12, 1974

[54] HANDLE SUPPORT FOR A WALK-BEHIND MOWER

[75] Inventor: Lloyd Arnold Wykhuis, Mayville, Wis.

[73] Assignee: Deere & Company, Moline, Ill.

[22] Filed: May 14, 1973

[21] Appl. No.: 359,862

[52] U.S. Cl............... 56/17.5, 280/47.37 R, 56/255
[51] Int. Cl............................................ A01d 35/26
[58] Field of Search ...... 56/255, 320.1, 320.2, 17.5, 56/16.7–17.4; 280/47.37, 47.36, 47.34; 192/48.8; 180/19

[56] References Cited
UNITED STATES PATENTS

| 2,724,598 | 11/1955 | Knarzer | 280/47.37 R |
| 2,786,694 | 3/1957 | Gray | 280/47.37 R |
| 2,881,887 | 4/1959 | Faas | 198/48.8 |
| 2,966,365 | 12/1960 | Kortum | 280/47.37 R |
| 3,116,937 | 1/1964 | Price | 280/47.37 R |
| 3,144,258 | 8/1964 | Ottosen et al. | 280/47.37 R |
| 3,196,971 | 7/1965 | Schantz | 180/19 |

Primary Examiner—Russell R. Kinsey

[57] ABSTRACT

A walk-behind rotary mower includes a stamped sheet metal deck on the top central portion of which is mounted a motor for driving the mower blade. A handle is pivotally connected to a rear portion of the deck and is supported by means of a pair of rearwardly extending support arms which are pivotally connected to the opposite ends of a transverse bracket fixed to the rear side of the motor.

6 Claims, 2 Drawing Figures 3,791,116

3,791,116

HANDLE SUPPORT FOR A WALK-BEHIND MOWER

BACKGROUND OF THE INVENTION

The present invention relates to a support for the handle of a walk-behind mower and more particularly relates to a support for a handle to be used in conjunction with a rotary mower having a stamped sheet metal deck.

Handles of walk-behind rotary mowers are normally connected to and supported by portions of the mower deck spaced rearwardly from the back side of the motor or engine of the mower. In addition to transmitting the pushing force to the mower housing, the handle is often used as a lever for raising the mower housing about the axis of the rear wheels as when the mower is being turned sharply so as to make a pass adjacent to the one just completed. Due to the inherent lack of rigidity in stamped mower housings, this latter maneuver of using the handle to raise the mower about the axis of the rear wheels has a deleterious effect on the housing since stresses occur centrally through the housing due to the fact that the forces transmitted by the handle act on the rear of the housing while the weight of the engine is acting on the housing forwardly of the handle connection. These flections of the mower housing in time cause fatigue cracks in the housing and these flections and distortions may sometimes be great enough to result in the mower blade coming into conflict with the housing.

SUMMARY OF THE INVENTION

According to the present invention, there is provided a novelly supported handle for a walk-behind mower.

An object of the invention is to provide a mower handle mounting constructed so as to prevent flection-inducing forces from being transferred to a stamped mower deck while at the same time preserving desirable operating characteristics of the handle. More specifically, it is an object of the invention to support a mower handle through a connection made with the mower housing including the mower motor or engine.

A more specific object is to provide a mower handle which is pivotally connected to the rear portion of the mower deck and which is supported in a desired position relative to its pivotal connection with the deck by means of a pair of handle support members having their forward ends pivotally connected to a bracket fixed to the backside of the mower engine.

A further object is to provide a handle which is mounted in the manner described in the foregoing paragraph and wherein the handle support members include a lost-motion connection with the handle so as to effect a more desirable operating characteristic in the handle.

These and other objects will become apparent from the following description and the appended drawing.

DESCRIPTION OF THE PREFERRED EMBODIMENT

Figure 1:
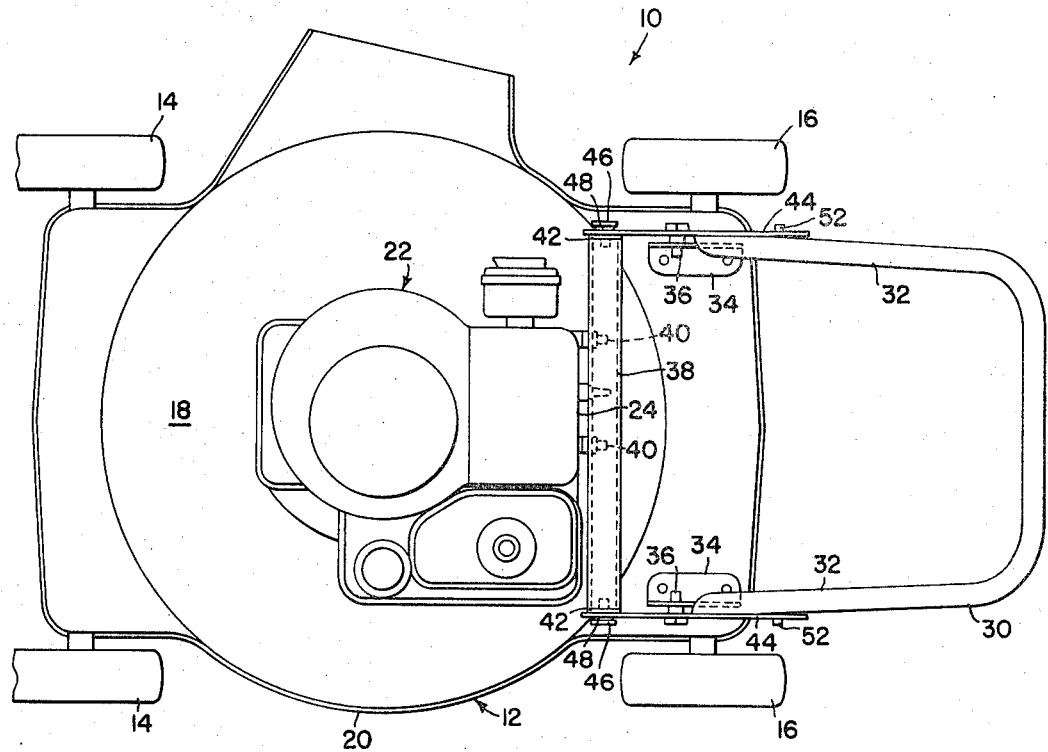
FIG. 1 is a top plan view of a rotary lawn mower incorporating the handle supporting means constructed according to the present invention.

Referring now to the drawing, therein is shown a rotary lawn mower indicated in its entirety by the reference numeral 10. The mower 10 includes a stamped sheet metal housing 12 which is supported on front and rear pairs of wheels 14 and 16 which are connected to forward and rearward portions of the housing. The housing 12 includes a generally planar top 18 from which depends a skirt 20 to thus form an open bottom enclosure. Mounted centrally on the top 18 of the housing is an internal-combustion engine 22 having a head portion 24 which covers a piston and cylinder (not shown), the piston being connected to a crankshaft 26 having its lower end projecting through the housing top 18. A mower blade 28 is secured to the lower end of the crankshaft 26 for rotation therewith within the housing 12.

Figure 2:
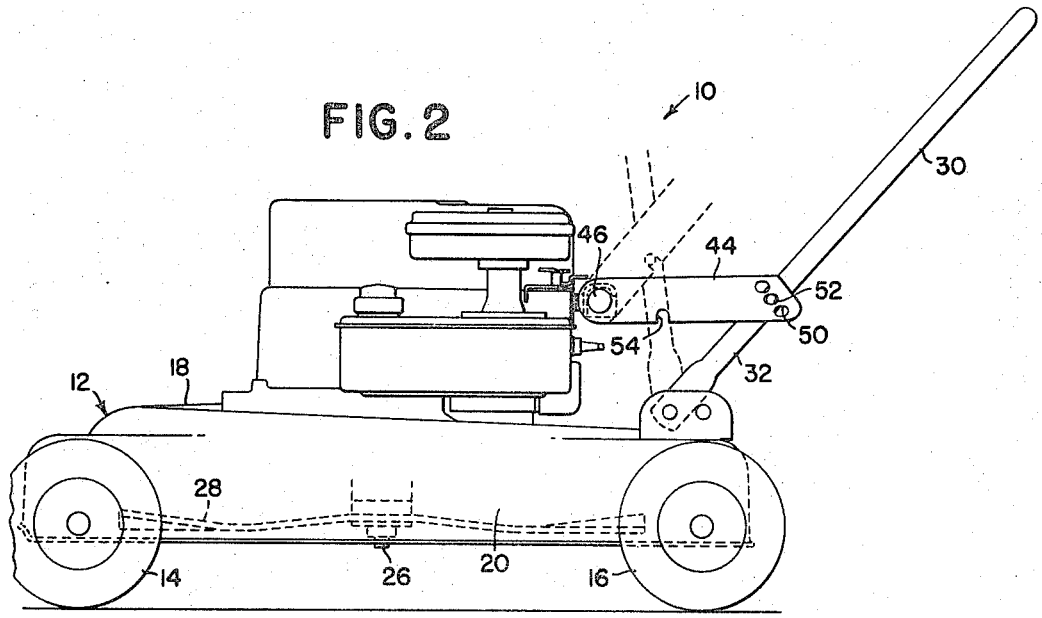
FIG. 2 is a side elevational view of the rotary mower shown in FIG. 1.

Provided for transmitting a pushing force to the housing 12 is a mower handle of which only the lower portion thereof is shown at 30. The mower handle 30 includes a pair of transversely spaced legs 32 having their lower ends respectively pivotally connected to a pair of transversely spaced brackets 34 through means of a pair of pins 36, the brackets being fixed to the rear portion of the housing 12 at a location spaced rearwardly of the engine 22. The handle is selectively supported in desired vertical positions relative to the connection thereof with the brackets through a support means including a transversely extending bracket 38 formed of an angle member having one leg thereof oriented vertically at the backside of the engine head 24 and having its other leg projecting rearwardly from the top of the vertical leg, the vertical leg being fixed to the engine head by means of stud-ended head bolts 40. Respectively fixed to the opposite ends of the angle member forming the bracket 38 are a pair of end plates 42 to which the forward ends of a pair of rearwardly extending strap-like handle support members 44 are connected through means of bolts 46 which respectively extend into axially aligned transverse threaded apertures. A pair of rubber washers 48 are located on the bolts 46 between the handle support members 44 and the bracket ends 42 and serve to bias the handle support members 44 into respective longitudinal positions, as shown, wherein they are parallel to each other. The rearward ends of the handle support members 44 are each provided with three transverse holes 50 and the handle legs 32 are respectively provided with axially aligned transverse pins 52 which are received in corresponding ones of the holes 50. The bottom edges of the handle support members 44 are each provided with a notch 54 for selectively receiving one of the pins 52 when the handle is moved to a nonoperative position for storing as indicated in dashed lines in FIG. 2.

It is here noted that the holes 50 are fore-and-aft elongated so as to effect a lost-motion connection between the handle and the handle support members 44 for permitting the handle to be pivoted a limited amount about the axis of the pins 36. This lost-motion improves the handling characteristics of the mower since an operator is able to more easily control the time when he wishes to raise the forward end of the mower by pushing the handle downwardly. Otherwise, the forward end of the mower might be inadvertently raised off the ground when the mower traverses undulating areas of the lawn.

Accordingly, during operation when it is desired to lift the front end of the mower so as to reverse the direction of the mower, for example, the operator need only to press the handle downwardly so as to cause the pins 52 to respectively travel to the rearward portions of the respective adjustment holes 50 and then transfer the lifting force to the handle support members 44 which in turn act on the central portion of the housing 12 through means of the transverse bracket 38 and engine 22. Since the engine is quite heavy in comparison to the housing 12 and the bracket 38 is spaced vertically from the housing, the lifting force will easily and positively cause the mower to be rocked vertically about the axis of the rear wheels 16. This action, of course, takes place without any forces acting on the mower housing which would cause the latter to be deformed.

While the particular handle support connection described above is particularly adapted for use with a mower having a stamped deck, it would also have some advantages when used in combination with a cast deck since it would lessen the effort required by the operator to rock the mower vertically upwardly about the axis of its rear support wheels. cm I claim:

1. In a lawn mower of the type including a housing having a top wall and depending side walls defining an open bottom enclosure, a motor being mounted on a central portion of said top wall and having a vertical drive shaft projecting through said top wall into said enclosure, a generally horizontal cutting blade being fixed to said drive shaft for rotation therewith, and front and rear pairs of wheels being respectively rotatably connected to front and rear portions of said housing for supporting the latter above the ground, the improvement comprising: first bracket means being fixed to said housing rearwardly of said motor; a second bracket means being secured to a rear side portion of said motor at a location above the level of said first bracket means; a handle including a lower end portion pivotally connected to said first bracket means for movement about a first substantially horizontal transverse axis; a rigid handle support means having forward and rearward end portions; first connection means connecting said forward end portion of said handle support means to said second bracket means for movement about a second substantially transverse horizontal axis; and second connection means releasably connecting said rearward end portion of said handle support means to said handle above the lower end thereof.

2. The lawn mower defined in claim 1 wherein said second connection means includes lost-motion means through which the handle is pivotable a limited amount about said first transverse axis.

3. The lawn mower defined in claim 1 wherein said housing is stamped sheet metal.

4. The lawn mower defined in claim 1 wherein said handle includes a pair of transversely spaced legs having respective lower ends pivotally connected to said first bracket means; said second bracket means including opposite ends respectively located in substantial fore-and-aft alignment with said pair of legs; and said handle support means including a pair of strap-like members having respective forward ends respectively pivotally connected to the opposite ends of said second bracket means.

5. The lawn mower defined in claim 4 wherein said pair of strap-like members are substantially horizontally disposed.

6. The lawn mower defined in claim 4 wherein said second bracket means includes a substantially horizontal transverse angle member having one leg disposed vertically adjacent the rearward side of and connected to said motor and a second leg extending rearwardly from the one leg and forming a top of the bracket; and said opposite ends of said second bracket means comprising a pair of end plates integral with the opposite ends of said angle member.

* * * * *